United States Patent
Yu et al.

(10) Patent No.: US 8,066,399 B2
(45) Date of Patent: Nov. 29, 2011

(54) SOLAR ENERGY STREET LAMP STRUCTURE WITH ADJUSTABLE ANGLE

(75) Inventors: Ching-Hue Yu, Jhubei (TW); Chih-Chen Chen, Jhubei (TW)

(73) Assignee: United Lighting Opto-Electronic Inc., Hsinchu (TW)

( * ) Notice: Subject to any disclaimer, the term of this patent is extended or adjusted under 35 U.S.C. 154(b) by 240 days.

(21) Appl. No.: 12/511,197

(22) Filed: Jul. 29, 2009

(65) Prior Publication Data

US 2010/0302765 A1   Dec. 2, 2010

(30) Foreign Application Priority Data

Jun. 2, 2009  (TW) ................................ 98118122 A

(51) Int. Cl.
*F21L 4/00* (2006.01)
(52) U.S. Cl. ..................................................... 362/183
(58) Field of Classification Search .................... 362/183
See application file for complete search history.

(56) References Cited

U.S. PATENT DOCUMENTS

| | | | | |
|---|---|---|---|---|
| 4,200,904 A | * | 4/1980 | Doan ............................. | 362/183 |
| 5,171,088 A | * | 12/1992 | Tellier et al. .................. | 362/428 |
| 5,203,621 A | * | 4/1993 | Weinmeister et al. ........ | 362/486 |
| 6,784,357 B1 | * | 8/2004 | Wang ............................. | 136/244 |
| 6,951,408 B2 | * | 10/2005 | Stewart .......................... | 362/183 |
| 7,731,383 B2 | * | 6/2010 | Myer ............................. | 362/145 |
| 2008/0298051 A1 | * | 12/2008 | Chu ................................ | 362/183 |

FOREIGN PATENT DOCUMENTS

TW         M283111         9/2005

* cited by examiner

*Primary Examiner* — Robert May
(74) *Attorney, Agent, or Firm* — Stites & Harbison PLLC; Juan Carlos A. Marquez, Esq.

(57) ABSTRACT

A solar energy street lamp structure with an adjustable angle is provided. The solar energy street lamp structure includes a lamp holder, a lighting unit, a photovoltaic panel, an electric power storage portion, and an actuation portion. A frame and a holder of the lamp holder are movably coupled by pivot units. The electric power storage portion is placed inside the lamp holder. An actuation unit of the actuation portion is connected between the frame and the holder for adjusting an angle between the frame and the holder such that the lighting unit and the photovoltaic panel, both disposed on the holder, are adjustable synchronously. The photovoltaic panel and the lighting unit are rotatable according to an incident angle of sunlight by adjusting the holder. Thus, the solar energy street lamp structure generates power at enhanced efficiency and can emit light in various directions so as to have wide applicability.

7 Claims, 8 Drawing Sheets

SOLAR ENERGY STREET LAMP STRUCTURE WITH ADJUSTABLE ANGLE

BACKGROUND OF THE INVENTION

1. Technical Field

The present invention relates to angle-adjustable solar energy street lamp structures and, more particularly, to a solar energy street lamp structure with an adjustable angle for use with street lamps.

2. Description of Related Art

With crude oil prices continuously on the rise worldwide due to the gradual depletion of petroleum fuel, and with global greenhouse gas emissions being under regulation after the Kyoto Protocol was signed, almost all major countries in the world have devoted considerable resources to the research of alternative energy sources such as electricity generated by wind power or hydraulic power, biodiesel, solar energy, and so on. Of the various technologies of alternative energy sources, solar energy technology is the most highly developed.

Solar energy is used mainly by converting light energy from the sun into electric power and is presently applicable to solar energy vehicles, indoor lighting, outdoor bulletins, and so forth. Now that street lamps are commonly seen in our daily life and are exposed to the sun for a long time, it is very suitable for street lamps to be powered by solar energy. Besides, solar energy street lamps may also solve the problem of inconvenient power cable deployment in remote areas.

Taiwan Patent No. M283111 discloses a "Solar Energy Street Lamp" comprising a lamp holder, a lighting device, a rechargeable battery, and a photovoltaic panel. The photovoltaic panel absorbs solar energy, converts the absorbed solar energy into electric power, and delivers the electric power to the rechargeable battery. The rechargeable battery then supplies necessary electric power to the lighting device and thereby drives the lighting device to emit light.

However, solar energy street lamps are mostly located along urban streets, where sunlight may be blocked by nearby buildings. In such cases, the solar energy street lamps are exposed to the sun only for part, but not all, of the daytime hours such that the solar energy absorbed by the solar energy street lamps is insufficient to generate enough electric power for sustaining light emission by lighting devices of the solar energy street lamps. Consequently, nighttime illumination on the streets is compromised.

BRIEF SUMMARY OF THE INVENTION

It is an objective of the present invention to provide a solar energy street lamp structure with an adjustable angle, wherein the solar energy street lamp structure includes an angle-adjustable holder such that a photovoltaic panel provided on the holder is angularly adjustable according to an incident angle of sunlight so as to absorb solar energy at enhanced efficiency.

It is another objective of the present invention to provide a solar energy street lamp structure with an adjustable angle, wherein a photovoltaic panel and a lighting unit are integrated in such a way as to be both provided on a holder. Thus, the solar energy street lamp structure is simplified and incurs relatively low costs.

It is a further objective of the present invention to provide a solar energy street lamp structure with an adjustable angle, wherein through integration of a photovoltaic panel and a lighting unit, in addition to the fact that the photovoltaic panel and the lighting unit will not actuated at the same time, the photovoltaic panel can dissipate heat through the lighting unit, and the lighting unit through the photovoltaic panel, thereby increasing the efficiency of heat dissipation.

In order to achieve the above and other objectives of the present invention, the present invention provides a solar energy street lamp structure with an adjustable angle, wherein the solar energy street lamp structure includes a lamp holder, at least one lighting unit, at least one photovoltaic panel, an electric power storage portion, and an actuation portion. The lamp holder includes a frame and a holder. The frame is a rod having an end portion provided with a first pivot unit. The holder has a first surface and a second surface that is disposed opposite from the first surface. The holder is further provided with a second pivot unit that is movably coupled with the first pivot unit to enable angular adjustment of the holder. The at least one lighting unit is provided on the first surface of the holder while the at least one photovoltaic panel is provided on the second surface of the holder. The electric power storage portion is provided inside the lamp holder and electrically connected to the at least one lighting unit and the at least one photovoltaic panel, respectively. The actuation portion includes an actuation unit provided between the frame and the holder, and a control unit electrically connected to the electric power storage portion. The control unit is configured for controlling the at least one photovoltaic panel to start or stop charging the electric power storage portion and for turning on or off the at least one lighting unit.

Implementation of the present invention at least provides the following inventive effects:

1. By providing both the at least one lighting unit and the at least one photovoltaic panel on the holder, the solar energy street lamp structure is simplified and therefore incurs relatively low costs;

2. Now that the solar energy street lamp structure is simplified, it is relatively easy to place the center of gravity of the solar energy street lamp structure at the center of the entire structure so as to provide increased resistance to typhoons and external shocks;

3. The angle-adjustable holder of the solar energy street lamp structure allows the at least one photovoltaic panel to adjust according to an incident angle of sunlight so as to generate electric power at enhanced efficiency; and 4. As the at least one lighting unit and the at least one photovoltaic panel can dissipate heat via each other, heat dissipation is carried out at increased efficiency.

BRIEF DESCRIPTION OF THE SEVERAL VIEWS OF THE DRAWINGS

A detailed description of further features and advantages of the present invention is given below so that a person skilled in the art is enabled to understand and implement the technical contents of the present invention and readily comprehend the objectives and advantages thereof by reviewing the teachings disclosed herein and the appended claims in conjunction with the accompanying drawings, wherein:

DETAILED DESCRIPTION OF THE INVENTION

Figure 1A:
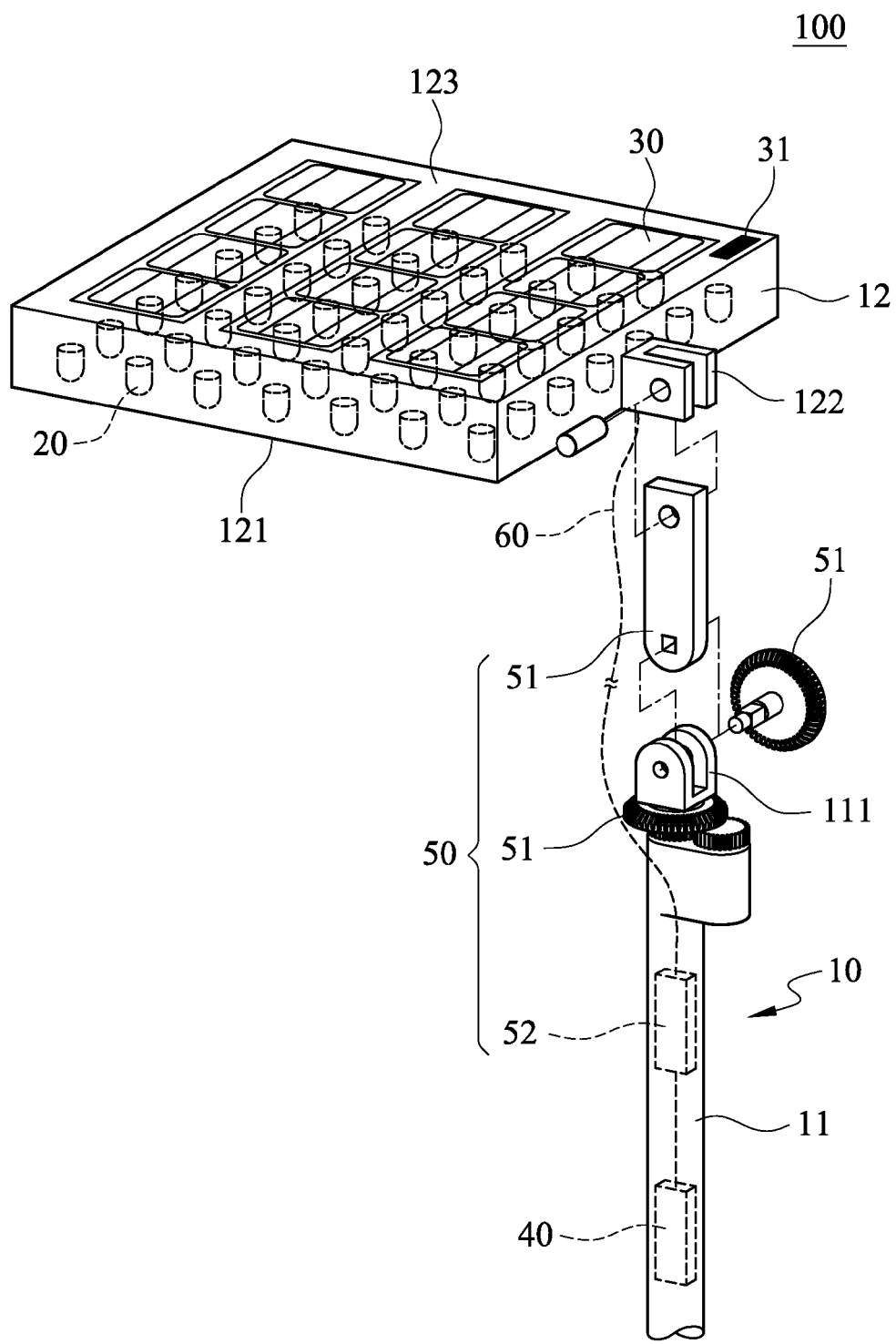
FIG. 1A is an exploded perspective view of a solar energy street lamp structure with an adjustable angle according to an embodiment of the present invention.
Figure 1B:
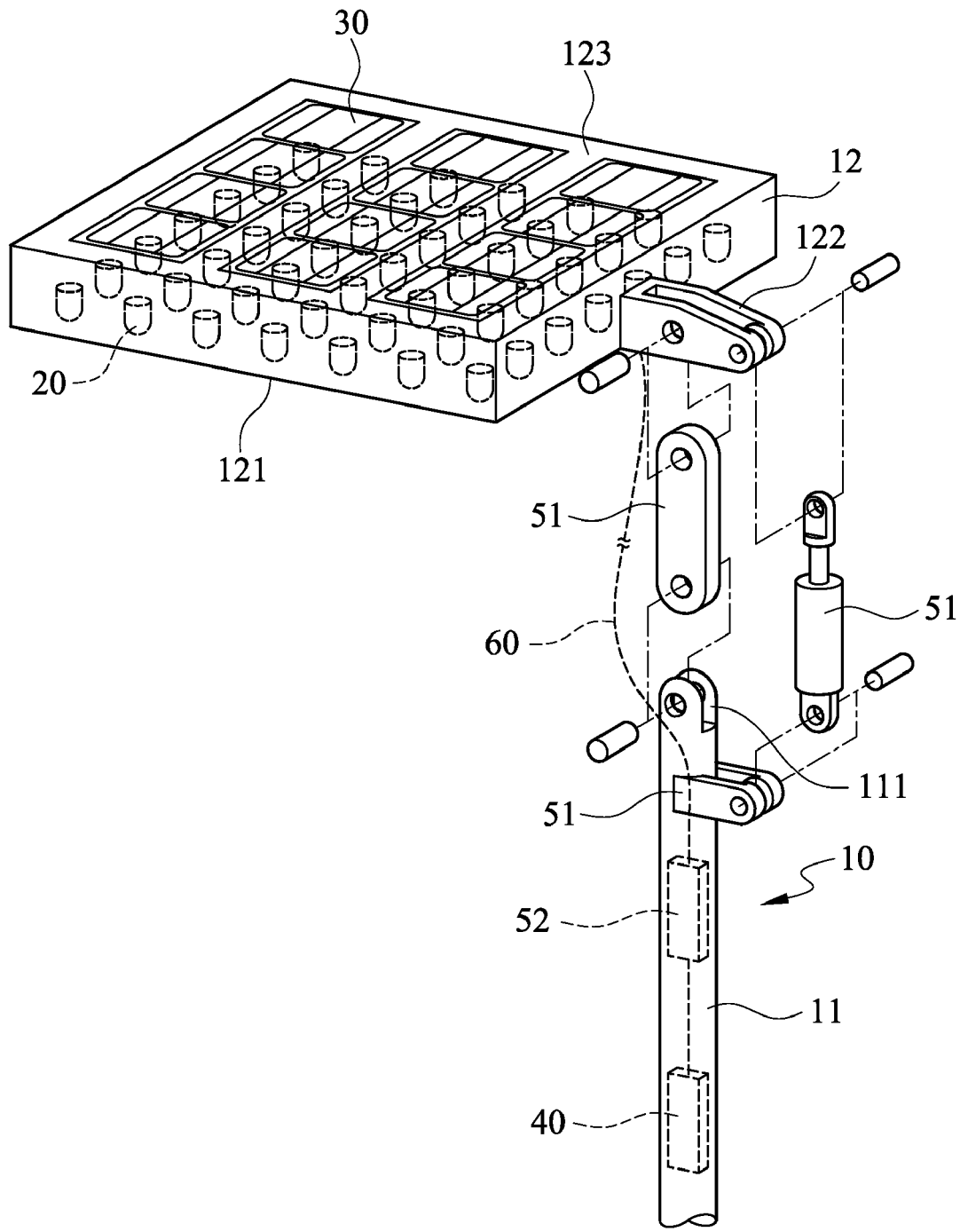
FIG. 1B is an exploded perspective view of a solar energy street lamp structure with an adjustable angle according to another embodiment of the present invention.

Referring to FIG. 1A and FIG. 1B, a solar energy street lamp structure 100 with an adjustable angle according to an embodiment of the present invention includes a lamp holder 10, at least one lighting unit 20, at least one photovoltaic panel 30, an electric power storage portion 40, and an actuation portion 50.

As shown in FIG. 1A and FIG. 1B, the lamp holder 10 includes a frame 11 and a holder 12. The frame 11 is configured for supporting the holder 12 and is formed as a rod having an end portion provided with a first pivot unit 111.

As shown in FIG. 1A and FIG. 1B, the holder 12 has a first surface 121 and a second surface 123 and is provided with a second pivot unit 122. The first surface 121 and the second surface 123 are disposed opposite from each other. The second pivot unit 122 is movably coupled with the first pivot unit 111 of the frame 11.

Figure 2A:
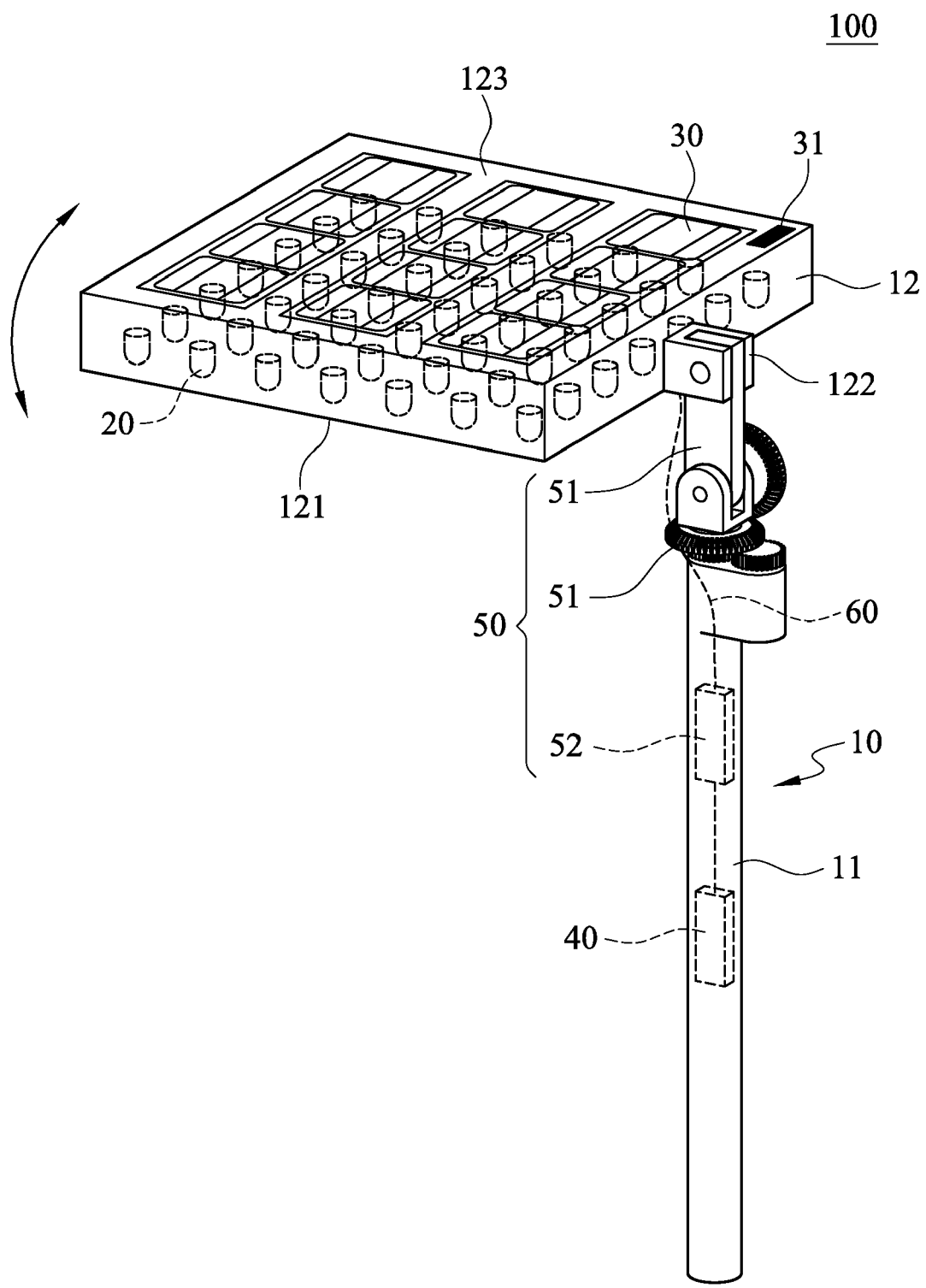
FIG. 2A is an assembled perspective view of the solar energy street lamp structure shown in FIG. 1A.
Figure 2B:
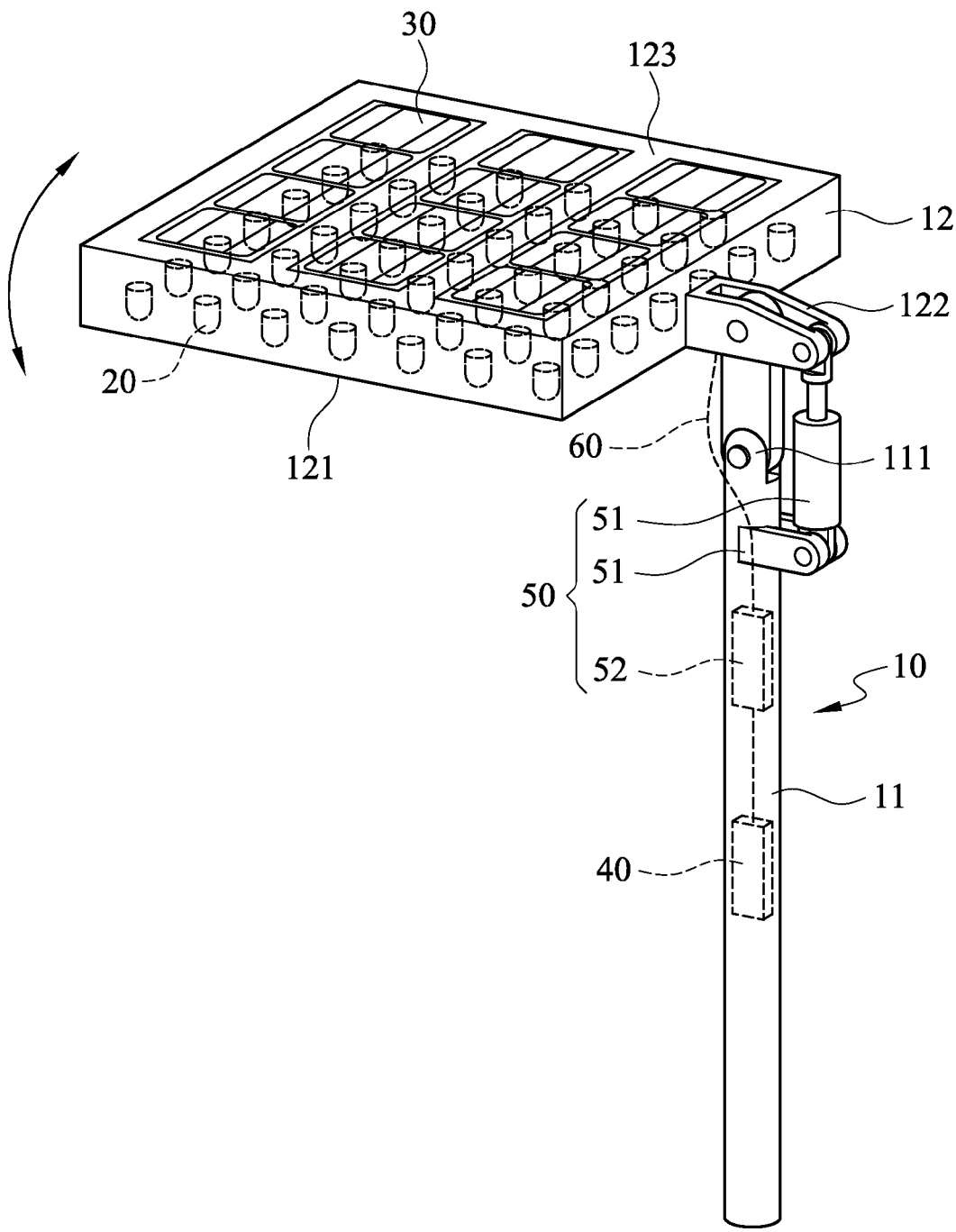
FIG. 2B is an assembled perspective view of the solar energy street lamp structure shown in FIG. 1B.

The second pivot unit 122 can be provided on any lateral side of the holder 12. Hence, after the second pivot unit 122 is movably coupled with the first pivot unit 111, the frame 11 is located at whichever lateral side of the holder 12 where the second pivot unit 122 is provided, as shown in FIG. 2A and FIG. 2B.

Figure 3A:
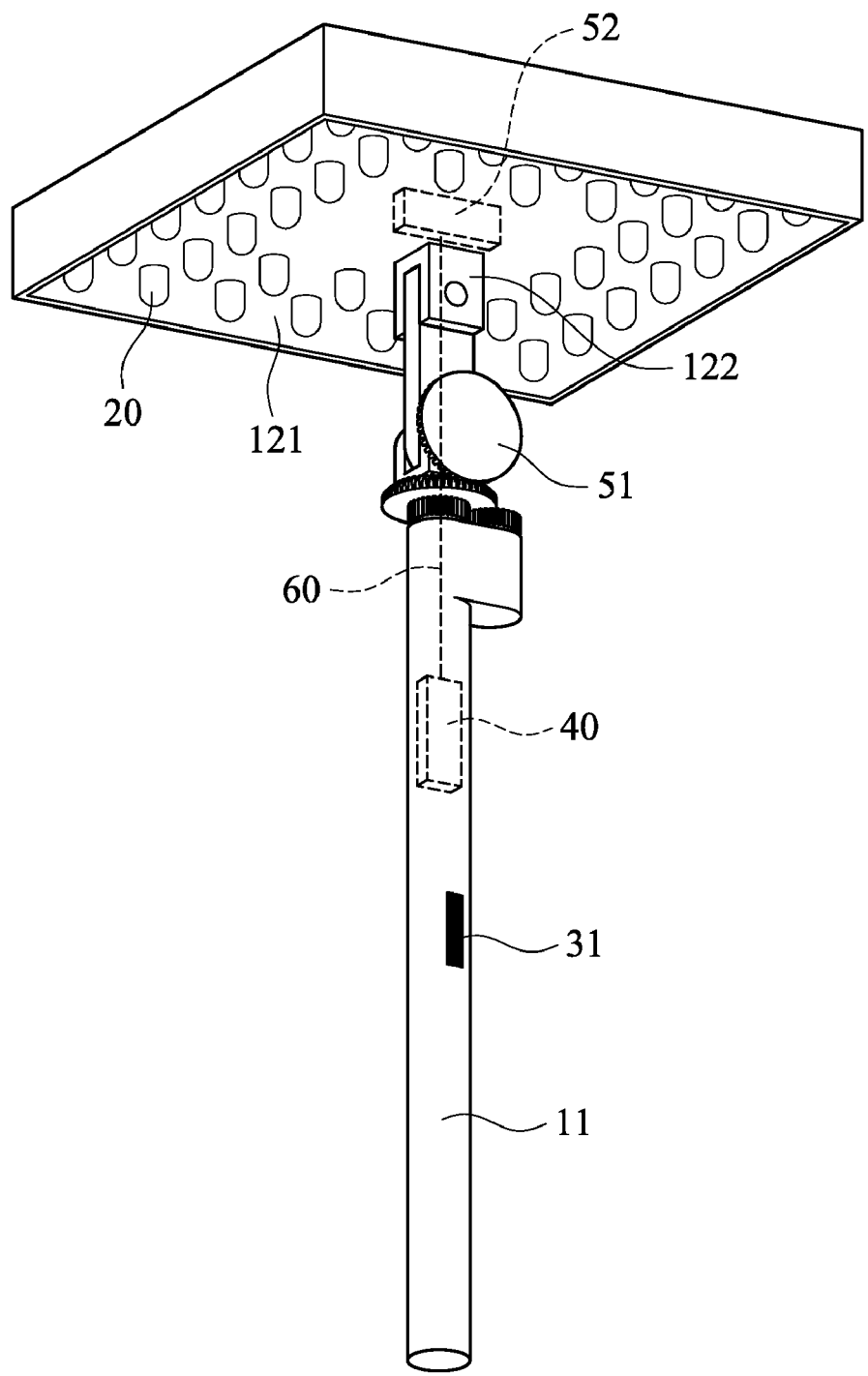
FIG. 3A is a perspective view of a solar energy street lamp structure with an adjustable angle according to yet another embodiment of the present invention.
Figure 3B:
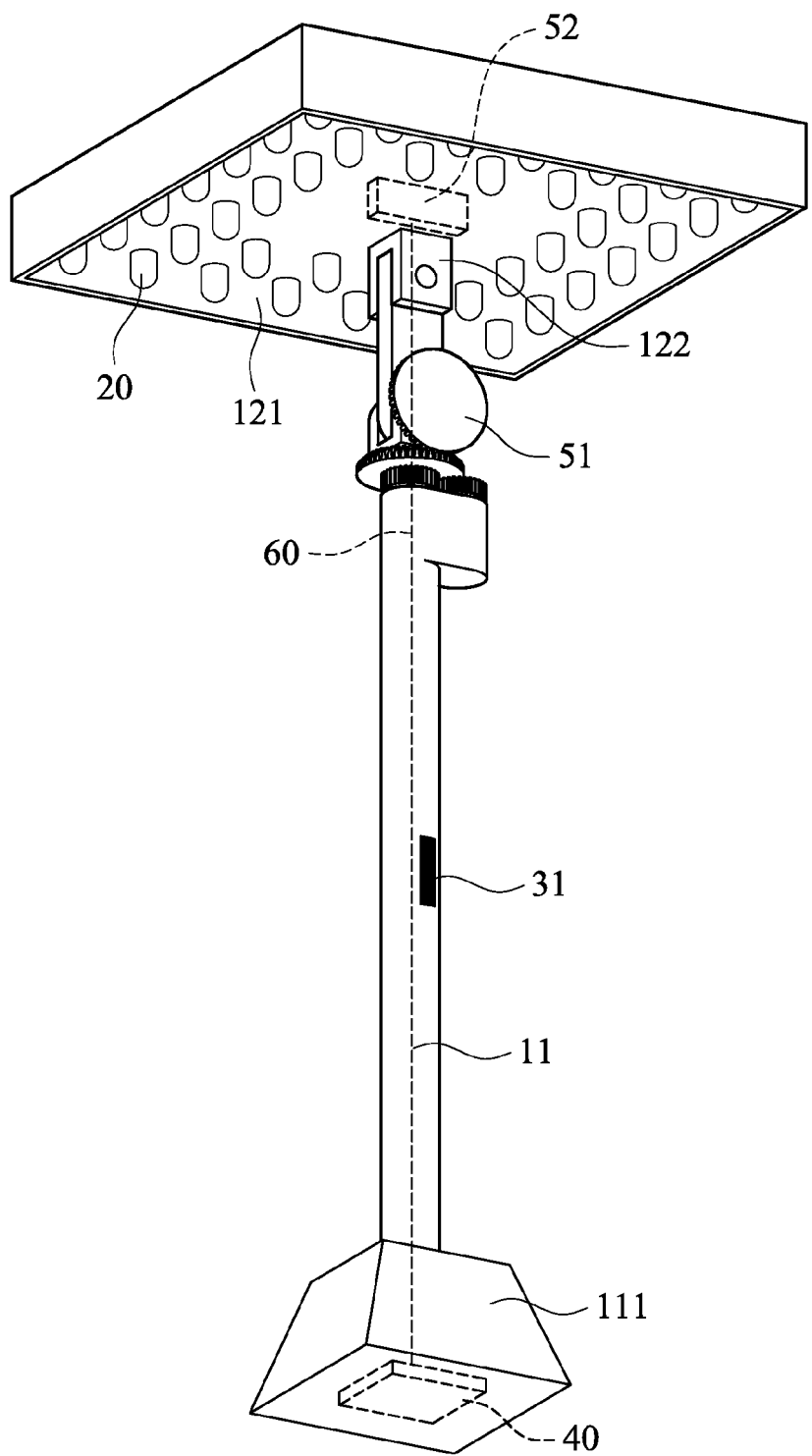
FIG. 3B is a perspective view of a solar energy street lamp structure with an adjustable angle according to still another embodiment of the present invention.
Figure 4:
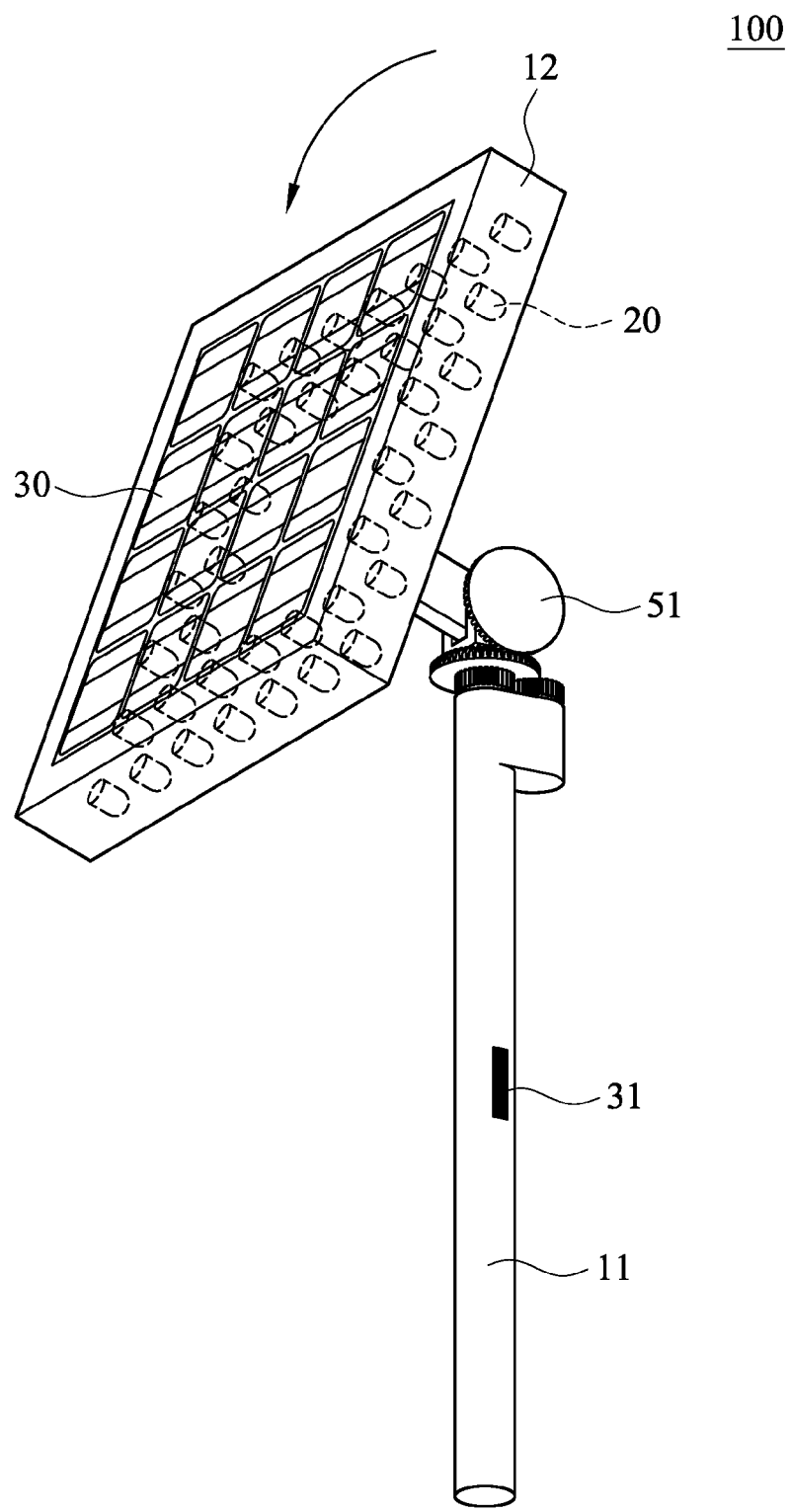
FIG. 4 is a perspective view showing application of the solar energy street lamp structure with an adjustable angle according to the present invention.

Alternatively, referring to FIG. 3A and FIG. 3B, the second pivot unit 122 is provided at a central portion of the first surface 121 such that the frame 11 is coupled to a central portion of the holder 12. By means of the movable coupling between the first pivot unit 111 and the second pivot unit 122, the holder 12 is capable of angular adjustment via rotation, as shown in FIG. 2A, FIG. 2B, and FIG. 4.

As shown in FIG. 1A to FIG. 2B, the at least one lighting unit 20 is provided on the first surface 121 of the holder 12, and the number of the at least one lighting unit 20 may vary so as to suit intended application of the solar energy street lamp structure 100. For example, if the solar energy street lamp structure 100 is installed on a street with heavy traffic, the at least one lighting unit 20 may be provided in a relatively large number to increase brightness of light emitted from the solar energy street lamp structure 100. The at least one lighting unit 20 may be a light-emitting diode.

As shown in FIG. 1A to FIG. 2B, the at least one photovoltaic panel 30 is provided on the second surface 123 of the holder 12 and is configured for absorbing solar energy and converting the absorbed solar energy into electric power. The solar energy street lamp structure 100 may use a plurality of the photovoltaic panels 30 or simply use a single large-area photovoltaic panel 30, as shown in FIG. 4, so as to absorb solar energy at enhanced efficiency.

As the at least one photovoltaic panel 30 and the at least one lighting unit 20 of the solar energy street lamp structure 100 are integrated in such a way as to be both provided on the holder 12, and the at least one photovoltaic panel 30 and the at least one lighting unit 20 will not function at the same time (i.e., the at least one photovoltaic panel 30 generates electricity only when it is sunny, and the at least one lighting unit 20 provides illumination only when there is no sunlight), the at least one photovoltaic panel 30, when actuated, can dissipate heat through a heat dissipation device of the at least one lighting unit 20; on the other hand, the at least one lighting unit 20, when actuated, can dissipate heat through the at least one photovoltaic panel 30 so as to have increased area for heat dissipation. Therefore, the at least one photovoltaic panel 30 and the at least one lighting unit 20 help each other in enhancing their respective heat dissipation efficiency.

A shown in FIG. 1A to FIG. 2B, the electric power storage portion 40 is disposed inside the lamp holder 10 and is electrically connected to the at least one lighting unit 20 and the at least one photovoltaic panel 30 via a wire 60. As shown in FIG. 3B, a base 13 is formed at a bottom portion of the lamp holder 10, and the electric power storage portion 40 is provided in the base 13.

Figure 5A:
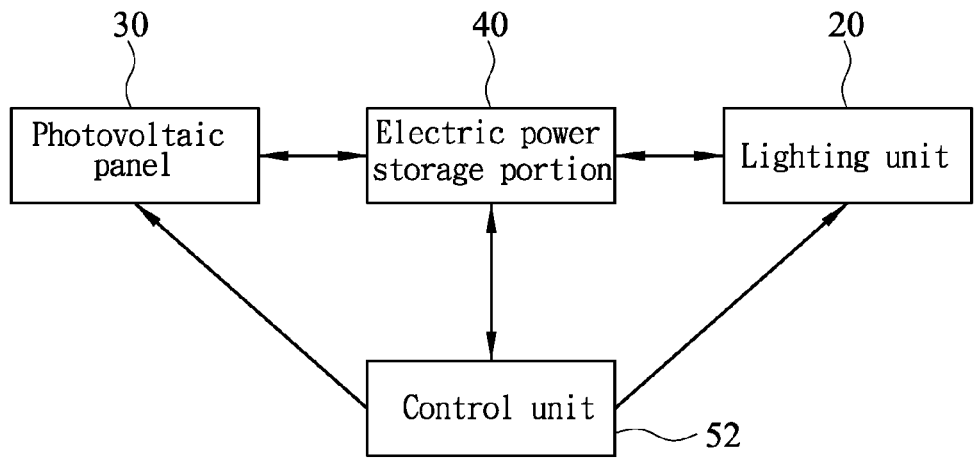
FIG. 5A is a circuit block diagram of the solar energy street lamp structure with an adjustable angle according to the present invention.

Referring to FIG. 5A, after the at least one photovoltaic panel 30 absorbs solar energy and converts the absorbed solar energy into electric power, the electric power is delivered to the electric power storage portion 40 for storage. Afterward, the electric power storage portion 40 supplies the electric power to the at least one lighting unit 20 and thereby drives the at least one lighting unit 20 to emit light. As the voltage and current output by the at least one photovoltaic panel 30 are not continuous, stable, and constant but vary with the intensity of sunlight, the electric power storage portion 40 may have a transformer unit 41, as shown in FIG. 5B, for modulating the voltage and current input into the electric power storage portion 40.

As shown in FIG. 1A to FIG. 2B, the actuation portion 50 includes an actuation unit 51 and a control unit 52. The actuation unit 51 is provided between the frame 11 and the holder 12. The actuation unit 51 is a driving device, as shown in FIG. 1A and FIG. 2A, wherein a gear set is provided to enable angular adjustment of the holder 12 relative to the frame 11, as shown in FIG. 2A and FIG. 2B. Alternatively, as shown in FIG. 1B and FIG. 2B, the actuation unit 51 is a hydraulic device or a pneumatic device capable of rotating the holder 12 hydraulically or pneumatically, as shown in FIG. 2A and FIG. 2B.

Referring to FIG. 5A, the control unit 52 is electrically connected to the electric power storage portion 40. The control unit 52 can be disposed inside the frame 11, as shown in FIG. 1A, or inside the holder 12, as shown in FIG. 3A, or inside the base 13, as shown in FIG. 3B. The control unit 52 is configured for controlling the at least one photovoltaic panel 30 to start or stop charging the electric power storage portion 40. Thus, the electric power storage portion 40 is prevented from being overcharged or over-discharged and may therefore have its service life extended. The control unit 52 is also configured for turning on or off the at least one lighting unit 20.

Figure 5B:
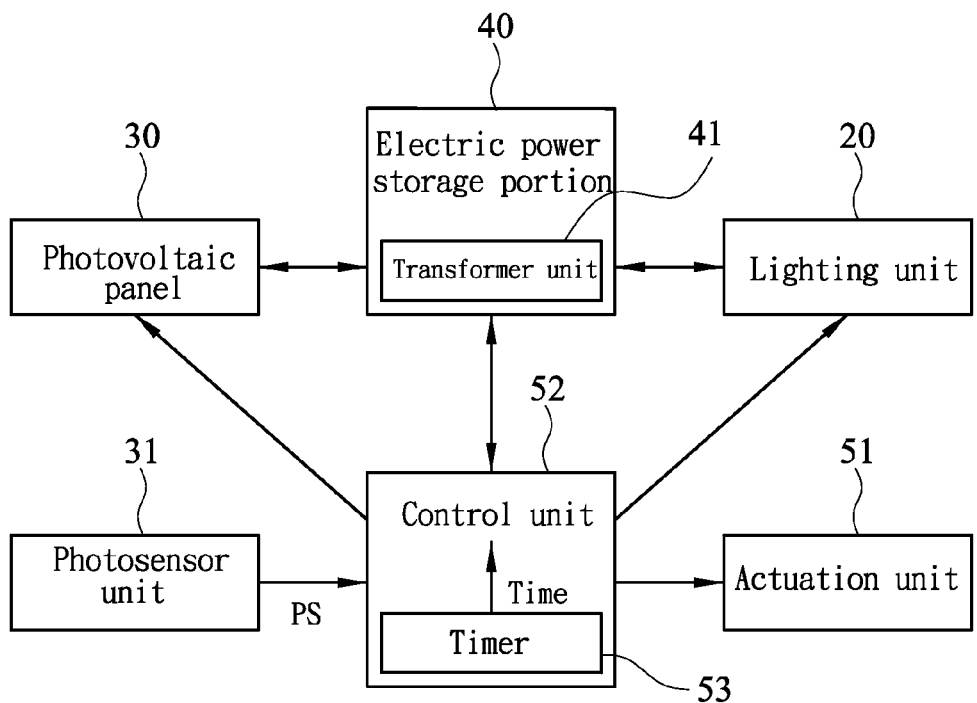
FIG. 5B is another circuit block diagram of the solar energy street lamp structure with an adjustable angle according to the present invention.

Referring to FIG. 5B, the solar energy street lamp structure 100 further includes a photosensor unit 31. The photosensor unit 31 is provided, without limitation, on the holder 12, as shown in FIG. 1A, or on the frame 11, as shown in FIG. 3A and FIG. 3B.

Referring to FIG. 5B, the photosensor unit 31 is configured for detecting light intensity around the solar energy street lamp structure 100 and generating at least one photosensor signal PS according to the detection result. The control unit 52 controls the actuation unit 51 according to the at least one photosensor signal PS. Thus, the actuation unit 51 drives the holder 12 to rotate to the direction with the highest light intensity, allowing the at least one photovoltaic panel 30 on the holder 12 to absorb the maximum amount of solar energy.

As shown in FIG. 5B, the control unit 52 further includes a timer 53 for setting at least one time signal Time. The control unit 52 controls the actuation unit 51 according to the at least one time signal Time so as to drive the holder 12 for rotation. For example, the at least one time signal Time of the timer 53 is so set as to contain a daily sunshine duration. Therefore, when the at least one time signal Time indicates daytime, the actuation unit 51 is controlled by the control unit 52 to rotate the second surface 123 of the holder 12 toward the sun, thus allowing the at least one photovoltaic panel 30 to absorb solar energy. However, when the at least one time signal Time indicates nighttime, the actuation unit 51 rotates the first surface 121 of the holder 12 toward the street so as to make efficient use of light emitted by the at least one lighting unit 20.

The content of the at least one time signal Time may vary with the season, and it is also possible to set several time signals Time for the same day such that the holder 12 is rotated according to the different time signals Time. For example, as the incident angles of sunlight at dawn, at noon, and at dusk vary from season to season, the holder 12 can be angularly adjusted according to the different incident angles of sunlight and the different sunshine durations, thus allowing the at least one photovoltaic panel 30 to always face the sun. Therefore, even if the solar energy street lamp structure 100 is located where long-term sunshine is unavailable, efficient power generation is still attainable to prevent the solar energy street lamp structure 100 from experiencing insufficient electric power.

Furthermore, as the holder 12 is rotatable, the lighting direction of the solar energy street lamp structure 100 is adjustable as needed, so as to extend the scope of application of the solar energy street lamp structure 100.

The foregoing embodiments are illustrative of the characteristics of the present invention so as to enable a person skilled in the art to gain insight into the disclosure of the present invention and to implement the present invention accordingly, but are not intended to restrict the scope of the present invention. Hence, all equivalent modifications and variations made in the foregoing preferred embodiments without departing from the spirit and principle of the present invention should fall within the scope of the appended claims.

What is claimed is:

1. A solar energy street lamp structure with an adjustable angle, the solar energy street lamp structure comprising:
 a lamp holder comprising a frame and a holder, wherein the frame is a bar having an end portion provided with a first pivot unit, and the holder has a first surface and a second surface disposed opposite from the first surface, and is provided with a second pivot unit movably coupled with the first pivot unit such that the holder is angularly adjustable;
 at least a lighting unit provided on the first surface of the holder;
 at least a photovoltaic panel provided on the second surface of the holder;
 an electric power storage portion provided inside the lamp holder and electrically connected to the at least a lighting unit and the at least a photovoltaic panel, respectively;
 an actuation portion comprising an actuation unit and a control unit, wherein the actuation unit is provided between the frame and the holder, and the control unit is electrically connected to the electric power storage portion and configured for controlling the at least a photovoltaic panel to start or stop charging the electric power storage portion and for turning on or off the at least a lighting unit; and
 a photosensor unit configured for generating at least a photosensor signal;
 wherein the control unit controls the actuation unit according to the at least a photosensor signal so as to rotate the holder.

2. The solar energy street lamp structure of claim 1, wherein the second pivot unit is located at a central portion of the first surface of the holder.

3. The solar energy street lamp structure of claim 1, wherein the control unit further comprises a timer for setting at least a time signal, and the control unit controls the actuation unit according to the at least a time signal so as to rotate the holder.

4. The solar energy street lamp structure of claim 1, wherein the at least a lighting unit is a light-emitting diode.

5. The solar energy street lamp structure of claim 1, wherein the actuation unit is a driving device.

6. The solar energy street lamp structure of claim 1, wherein the actuation unit is a hydraulic device.

7. The solar energy street lamp structure of claim 1, wherein the actuation unit is a pneumatic device.

* * * * *